United States Patent [19]

Furuse

[11] Patent Number: 4,729,244
[45] Date of Patent: Mar. 8, 1988

[54] FLOW RATE MEASURING APPARATUS

[75] Inventor: Akio Furuse, Hachioji, Japan

[73] Assignee: Cosmo Instruments Co., Ltd., Tokyo, Japan

[21] Appl. No.: 879,323

[22] Filed: Jun. 27, 1986

[30] Foreign Application Priority Data

Jan. 16, 1986 [JP] Japan .................................. 61-6958

[51] Int. Cl.⁴ .............................................. G01F 1/28
[52] U.S. Cl. ................................ 73/861.74; 73/861.53
[58] Field of Search ........... 73/861.53, 861.71, 861.72, 73/861.74, 861.75

[56] References Cited

U.S. PATENT DOCUMENTS

| 1,712,761 | 5/1929 | Furnivall et al. | 73/861.75 |
| 2,989,866 | 6/1961 | Widell et al. | 73/861.53 |
| 3,857,277 | 12/1974 | Moore | 73/861.74 |
| 3,955,415 | 5/1976 | Sharon | 73/861.74 |
| 4,083,245 | 4/1978 | Osborn | 73/861.53 |
| 4,474,068 | 10/1984 | Knetsch et al. | 73/861.53 |

FOREIGN PATENT DOCUMENTS

| 2558935 | 7/1977 | Fed. Rep. of Germany | 73/861.53 |
| 3138985 | 4/1983 | Fed. Rep. of Germany | 73/861.74 |

Primary Examiner—Herbert Goldstein
Attorney, Agent, or Firm—Weiser & Stapler

[57] ABSTRACT

An apparatus for measuring a flow rate of a fluid by a cantilever type pressure receiving plate which is disposed within a flow channel such that a substantially perpendicular fluid flow abuts against the surface at one end portion of the plate so that the cross-sectional area of said fluid flow opposing the end portion of the plate is increased when the end portion of the plate is deflected by the acting forces of the fluid flow.

16 Claims, 4 Drawing Figures

FLOW RATE MEASURING APPARATUS

BACKGROUND OF THE INVENTION

This invention concerns an apparatus for measuring the flow rate of a fluid such as a gas or liquid.

Various kinds of devices for measuring the flow rate of a gas or liquid are known.

The first example is an orifice type flow meter adapted to measure a differential pressure (Δp) generated between both sides of an orifice disposed within a flow channel, by means of a differential pressure detector. According to this flow meter, the volumetric flow rate (Q) of a fluid flowing through the flow channel is determined as:

$$Q \propto \sqrt{\Delta p}.$$

The second example is a pressure receiving plate type flow meter adapted to measure the force (Fn) of a fluid acting on a pressure receiving plate disposed within a flow channel. In this flow meter, the volumetric flow rate (Q) of a fluid flowing in the flow-channel is determined as:

$$Q \propto \sqrt{\frac{Fn}{\rho}}$$

where
 ρ: density of the fluid
 Fn: force acting on the pressure receiving plate.

In the orifice type flow meter of the first example as described above, detection of a small flow rate Q is difficult since only a slight differential pressure Δp is generated for small flow rates. On the other hand, if the flow rate Q is greater, since the differential pressure Δp is increased in proportion to the square of the flow velocity V, the differential pressure detector has to detect the differential pressure over a wide range. However, the detector capable of satisfying such a requirement is often expensive. Further, since the cross-sectional area in the flow channel of the orifice is constant, the pressure loss in the orifice is increased as the flow rate Q increases.

In order to overcome the foregoing drawbacks, there are known variable orifice type flow meters in which the bellows (or equivalent) of the flow meter are made movable responsive to the force of a fluid, thereby varying the cross-sectional area of the orifice flow channel. However, this flow meter is complicated in structure and is not suitable to the measurement of a small flow rate.

The pressure receiving plate type flow meter mentioned above as the second example is also not suitable to the measurement of a small flow rate since the volumetric flow rate is proportional to the square root of the force (Fn) acting on the pressure receiving plate.

SUMMARY OF THE INVENTION

It is, accordingly, an object of this invention to provide a flow rate measuring apparatus capable of a wide range of flow rate measurement.

Another object of this invention is to provide a flow rate measuring apparatus capable of measuring flow rate with great accuracy.

A further object of this invention is to provide a flow rate measuring apparatus which permits selection of the flow rate conversion characteristic.

According to this invention, these objects can be accomplished by an apparatus comprising a main body, a flow channel disposed within the main body for receiving a fluid flow, and the following components for measuring the flow rate of a fluid. One end portion of a pressure receiving plate of the cantilever type, and made of a resilient member, is inserted within the flow channel to receive a force applied by flow of the fluid against one surface of said one end portion. The other end portion is connected to the main body. A wall defining the cross-sectional area of the fluid flow together with a leading end of said one end portion, is positioned to oppose said leading end and has such a shape that the cross-sectional area of said flow at the position opposing said leading end is increased as the pressure receiving plate is deflected by said force. A deflection detector is provided for detecting the deflection of said pressure receiving plate.

In this invention, a flexible rectangular member is caused to protrude as a cantilever type pressure receiving plate into a flow channel. The flexible rectangular member is deflected by the perpendicular flow of a fluid abutting against the surface of the pressure receiving plate. The distance between the wall forming the flow channel and the pressure receiving plate is increased or decreased in accordance with the deflection of the pressure receiving plate, thereby changing the pressure loss of the flow channel.

Preferably, a magnetic plate is used for the deflection measuring portion of the pressure receiving plate, and a detection coil is used as a deflection detector. The volumetric flow rate of the fluid is measured by detecting the distance between the detection coil and the magnetic plate.

In the apparatus according to this invention, even a small flow rate can be converted into a large deflection of the pressure receiving plate by lowering the resiliency of the pressure receiving plate, narrowing the width of the pressure receiving plate, and decreasing the gap between the pressure receiving plate and the wall defining the flow channel. To the contrary, measurement of a large flow rate is also possible by increasing the resiliency of the pressure receiving plate, widening the width of the pressure receiving plate, and increasing the distance between the pressure receiving plate and the wall defining the flow channel.

The apparatus according to this invention is simple in structure, irrespective of its wide range.

This invention is further described in more detail by referring to the appended drawings, by which these and other objects, as well as the contruction of this invention, will become apparent.

DETAILED DESCRIPTION OF PREFERRED EMBODIMENTS

Figure 1:
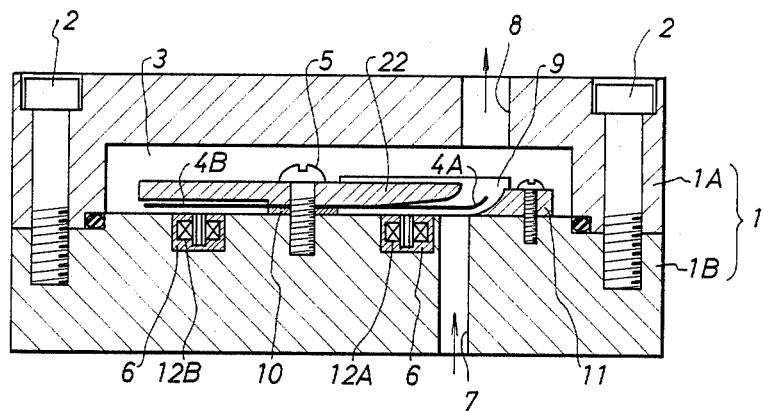
FIG. 1 is a vertical cross-sectional view taken along line I—I in FIG. 2, for one embodiment of the apparatus according to this invention.
Figure 2:
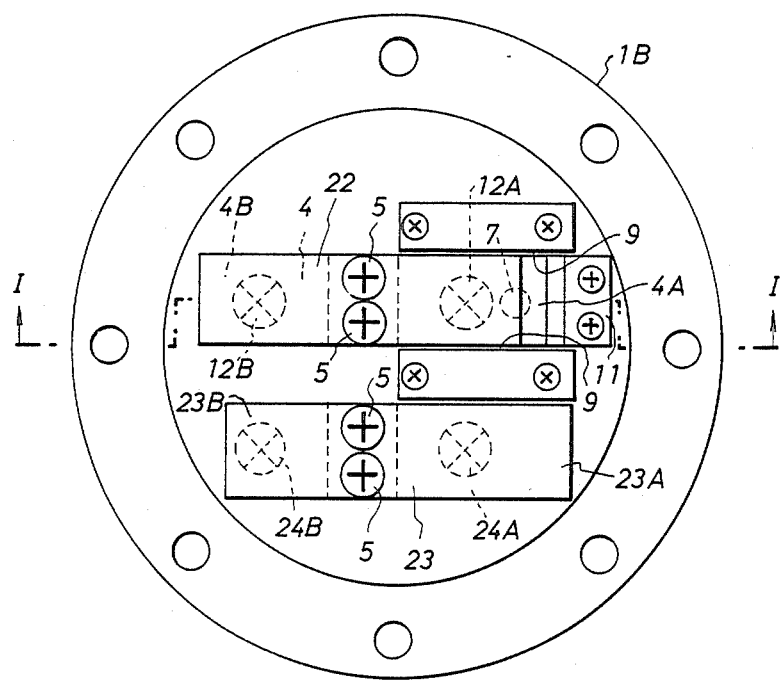
FIG. 2 is a plan view, with the upper body half removed, for one embodiment of the apparatus according to this invention.

FIGS. 1 and 2 show the structure of a preferred embodiment for the apparatus according to this invention. A body 1 comprises an upper body half 1A and a lower body half 1B, assembled by bolts 2. A hollow chamber 3 is formed at the juncture between the body halves 1A and 1B. A cantilever-type pressure receiving plate 4 is mounted in the hollow chamber 3 by means of a spacer 10, preferably having a 0.3 mm thickness for establishing a predetermined distance relative to the body half 1B. The pressure receiving plate 4 may be made of a resilient magnetic member, preferably having a thickness of 0.07 mm. The pressure receiving plate 4 has a rectangular shape as shown in FIG. 2, and is secured at about its longitudinal center to the body half 1B by means of small screws 5. The pressure receiving plate 4 may be reinforced by bending the leading end of the fore end portion 4A, for example, in a direction perpendicular to the longitudinal direction of the pressure receiving plate 4, and along the direction of fluid flow.

Apertures 7 and 8 constituting a flow channel for the fluid are formed in the body halves 1A and 1B, opposing the fore end portion 4A. The aperture 7 formed in the lower body half 1B constitutes a flow inlet and the aperture 8 formed in the upper body half 1A constitutes a flow exit in this embodiment.

Further, as shown in FIG. 1, a stopper 22 for protecting the pressure receiving plate 4 is disposed such that when an excess fluid pressure is exerted, the stopper 22 supports the pressure receiving plate 4 to inhibit excess deformation of the pressure receiving plate 4 and prevent its permanent deformation. The stopper 22 also extends toward the rear end portion 4B of the pressure receiving plate 4 to also cover and protect the rear end portion 4B.

For effectively applying forces due to the flow of the fluid to the pressure receiving plate 4, side walls 9 are disposed at positions opposing the side edges of the fore end portion 4A. A wall 11 is also disposed at a position opposing the leading end of the fore end portion 4A, in the longitudinal direction. The upper face of the wall 11 is shaped such that the change in rate of deflection of the fore end portion 4A of the pressure receiving plate 4 is increased when the fluid flow rate is smaller, and is decreased when the fluid flow rate is greater, in order to facilitate linearized compensation of the measured output. Preferably, the pressure receiving plate 4 is deflected in proportion with the fluid flow rate to achieve linearizing compensation of the measured output.

Deflection detection coils 12A and 12B are fixed to the lower body half 1B, using a filling material 6, such that they are situated below the fore end portion 4A and the rear end portion 4B. Coils wound around an E-type core are preferably used for the detection coils 12A and 12B. The deflection measuring portion of the core is located to oppose the pressure receiving plate 4. Depending on changes in the relative distance between the core and the pressure receiving plate 4, the inductance of the detection coils 12A and 12B changes, so that the deflection of the pressure receiving plate 4 can be determined by measuring the electric current flowing through the detection coils 12A and 12B.

Figure 3:
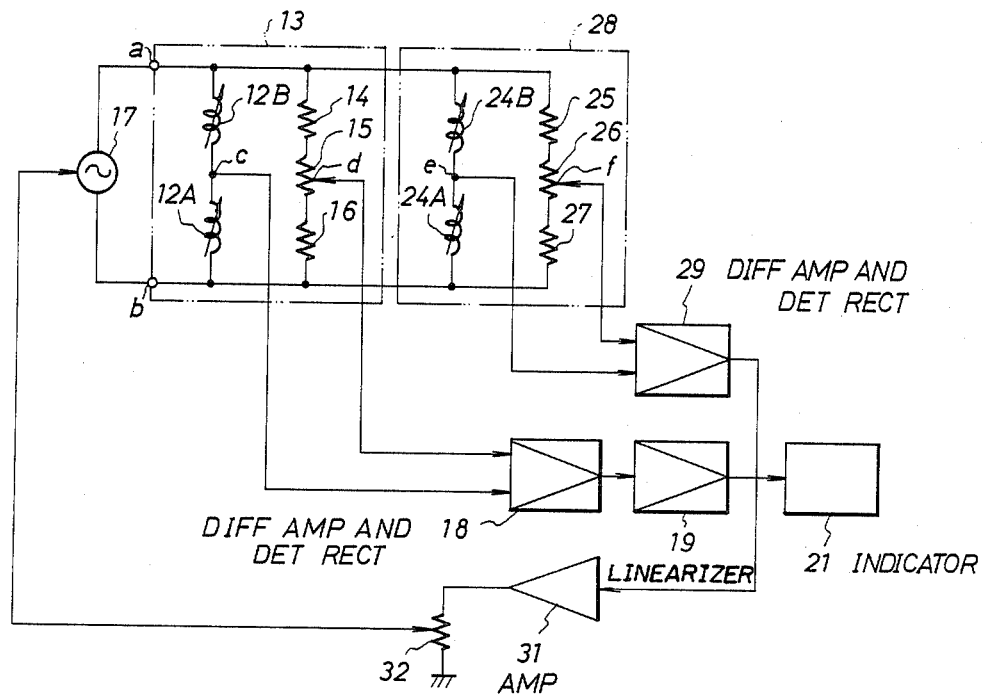
FIG. 3 is a schematic diagram showing an example of the electrical circuit used for the apparatus according to this invention.

As shown in FIG. 3, the detection coils 12A and 12B constitute a bridge circuit 13 in combination with resistors 14, 15 and 16. An oscillator 17 is connected between the terminals a and b of the bridge circuit 13, and an AC signal, preferably of about 5 KHz, is applied to the bridge circuit 13. The resistor 15 is a variable type resistor for adjusting the zero-point of the bridge circuit 13.

When the fore end portion 4A of the pressure receiving plate 4 is deflected by the acting force of a fluid flow, the inductance of the coil 12A changes and the amount of the change is obtained as a detection signal between terminals c and d of the bridge circuit 13. The detection signal is converted in a circuit 18 for differential amplification and detection-rectification into a DC current and transmitted by way of a linearizer 19, if required, to an indicator 21 which indicates the deflection of the pressure receiving plate 4.

Furthermore, in the apparatus according to this invention, a cantilever type gravity compensation plate 23 is disposed adjacent to the pressure receiving plate 4 and serves to compensate for the effects of gravity exerted on the pressure receiving plate 4 in accordance with the attitude of the body 1.

Specifically, the deflection of the fore end portion 4A and the rear end portion 4B of the pressure receiving plate 4 varies in accordance with the angle of inclination of the body 1. Since the change in the inductance of the detection coil 12A resulting from deflection in the fore end portion 4A due to gravity is equal to the change in the inductance of the detection coil 12B resulting from gravitational deflection of the rear end portion 4B (as a gravity detection plate), off-set in the zero-point of the detection signal between the terminals c and d in the bridge circuit 13 caused by gravity can be compensated.

However, since the distance between the pressure receiving plate 4 and the detection coils 12A, 12B is changed, although slightly, by gravity, there is a problem in that the detection sensitivity of the detection coils 12A, 12B varies. That is, when the body 1 stands upright, the fore end portion 4A and the rear end portion 4B of the pressure receiving plate 4 deflect toward the detection coils 12A and 12B under the effects of gravity. Since the flow rate is measured with the thus displaced position as the zero-point, the detection sensitivity is increased by the amount that the fore end portion 4A and the rear end portion 4B of the pressure receiving plate 4 are brought closer to the detection coils 12A, 12B. On the other hand, when the body 1 is overturned, the fore end portion 4A and the rear end portion 4B of the pressure receiving plate 4 are deflected away from the detection coils 12A and 12B. Accordingly, the detection sensitivity is decreased for the opposite reasons as described above.

In order to compensate for deviation of the detection sensitivity of the detection coils 12A, 12B, the gravity compensation plate 23 and the detection coils 24A, 24B are provided. The gravity compensation plate 23 is secured, together with a spacer 10 preferably having a 0.3 mm thickness, by means of small screws 5. The gravity compensation plate 23 has a rectangular shape, in which the distance from the point secured with the small screw 5 to the fore end portion 23A is greater than that to the rear end portion 23B. The gravity compensation plate 23 is made of a resilient magnetic member, preferably having a thickness of 0.07 mm. Since the gravity compensation plate 23 is asymmetrical in its longitudinal direction with respect to the fulcrum position (the position secured by means of the screws 5), a difference results in the change of the inductance of the detection coils 24A, 24B in accordance with the attitude of the body 1.

As shown in FIG. 3, the detection coils 24A, 24B constitute a bridge circuit 28, together with resistors 25, 26 and 27, in which the relative change in the inductance of the detection coils 24A, 24B described above is obtained between the terminals e and f of the bridge circuit 28. The resistor 26 is a variable type resistor for adjusting the zero-point of the bridge circuit 28. The attitude detection signal is converted by way of a circuit 29 for differential amplification and detection-rectification into a DC current and transmitted by way of an amplifier circuit 31 and a variable resistor 32, if required, to an oscillator 17. The variable resistor 32 is used for adjusting the amplification factor of the attitude detection signal. In this way, the oscillating output voltage from the oscillator 17 is controlled by the attitude detection signal to compensate for deviation of the detection sensitivity of the detection coils 12A, 12B due to the effect of gravity depending on variations in the attitude of the body 1.

Figure 4:
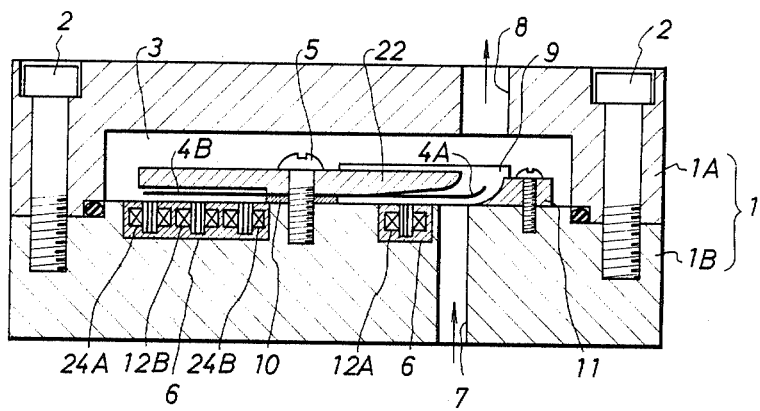
FIG. 4 is a vertical cross-sectional view for another embodiment of the apparatus according to this invention.

In the case where the gravity compensation plate 23 is not used, the attitude of the body 1 may be detected by positioning the detection coils 24A, 24B to face the pressure receiving plate 4. As shown in FIG. 4, the detection coils 24A, 24B are disposed at different positions in the direction extending from the fulcrum to the rear end portion 4B of the pressure receiving plate 4, with the detection coil 24A being situated rearward relative to the detection coil 24B.

Accordingly, when the rear end portion 4B of the pressure receiving plate 4 is deflected depending on the attitude of the body 1, the gravitational deflection corresponding to the detection coil 24A becomes larger than the gravitational deflection corresponding to the detection coil 24B. Accordingly, an output of the attitude detection signal, depending on the attitude of the body 1, is obtained between the terminals e and f of the bridge circuit 28 in the same manner as in the case where the gravity compensation plate 23 is used, compensating for deviation of the detection sensitivity due to the effect of gravity.

In cases where the attitude of the body 1 is predetermined, the gravity compensation plate 23 and the compensating bridge circuit 28 may be omitted since there is no requirement for the compensation of gravity.

Further, in cases where the width of the pressure receiving plate 4 is narrow, the reinforcing turn at the leading end of the fore end portion 4A can be omitted.

It is not always necessary that the pressure receiving plate 4 be made entirely of magnetic material. It may also be of such a structure that the magnetic material is bonded, only at the deflection measuring point, to an otherwise non-magnetic flexible material.

Furthermore, a highly electroconductive non-magnetic resilient member may be used for the pressure receiving plate 4, provided a high frequency voltage is applied to the detection coil to thereby generate an eddy current in the deflection measuring portion of the pressure receiving plate 4. The deflection of the pressure receiving plate 4 may then be detected depending on the magnitude of the eddy current resulting from such deflection.

According to the present invention, since the measuring error resulting from variation in the attitude of the apparatus can be decreased, flow rate can be measured with great accuracy. Further, since the cross-sectional area of the flow channel between the leading end of the fore end portion 4A of the pressure receiving plate 4 and the wall 11 is made variable by the deflection of the pressure receiving plate due to the acting forces of the fluid, measurement over a wide range of flow rates can be conducted. In addition, the flow rate conversion characteristic can optionally be selected depending on the shape of the wall 11 facing the leading end of the fore end portion 4A of the pressure receiving plate.

What is claimed is:

1. An apparatus for measuring a flow rate of a fluid, comprising:
    a main body;
    a flow channel disposed within said main body for receiving a fluid flow therethrough;
    a cantilever-type pressure receiving plate made of a resilent member, wherein one end portion of said pressure receiving plate is inserted within said flow channel to receive a force applied by a flow of said fluid at one surface of said one end portion, and wherein another end portion of said pressure receiving plate is supported on said main body;
    a wall defining a cross-sectional area for said fluid flow together with a leading end of said one end portion at a postion opposing said leading end, said wall having a shape such that said cross-sectional area for said fluid flow at said position is increased as said pressure receiving plate is deflected by said force;
    a first detector for detecting a first deflection of said one end portion of said pressure receiving plate, received in a hollow portion disposed within said main body and in communication with said flow channel;
    a cantilever-type gravity detection plate made of a resilient member and received in said hollow portion, wherein one end portion of said gravity detection plate is a free end supported within said main body;
    a second detector for detecting a second deflection of said one end portion of said gravity detection plate due to gravity; and
    a comparator for comparing said first deflection with said second deflection and for compensating said first deflection of said pressure receiving plate due to gravity.

2. The apparatus of claim 1, wherein said force is perpendicular to said one surface of said pressure receiving plate.

3. The apparatus of claim 1, wherein said wall is shaped such that said flow rate of said fluid is in proportion with said first deflection of said pressure receiving plate.

4. The apparatus of claim 1, wherein said gravity detection plate has the same shape as said pressure receiving plate, and is parallel and coplanar with said pressure receiving plate.

5. The apparatus of claim 1, wherein the distance between a supported portion of said pressure receiving plate and said first detector is equal to the distance between a supported portion of said gravity detection plate and said second detector.

6. The apparatus of claim 1, wherein said first detector is disposed at a position opposing said one end portion of said pressure receiving plate.

7. The apparatus of claim 6, wherein said first detector comprises a first coil connected to an AC signal oscillator, and the material of said pressure receiving plate at a position facing said first detector is made of a magnetic material.

8. The apparatus of claim 7, wherein said second detector is disposed at a positon opposing said one end portion of said gravity detection plate.

9. The apparatus of claim 8, wherein said second detector comprises a second coil connected to an AC signal oscillator, and the material of said gravity detection plate at a position facing said second detector is made of a magnetic material.

10. The apparatus of claim 9, wherein said first comparator comprises a first bridge circuit for comparing inductance of said first coil with inductance of said second coil.

11. The apparatus of claim 10, wherein said second detector is associated with third and fourth detectors for detecting third and fourth deflections at separate third and fourth longitudinally spaced positions of said gravity detection plate, a second comparator for comparing said third and fourth deflections, and transmission means for transmitting an output of said second comparator to said AC signal oscillator to control an oscillated output voltage from said AC signal oscillator.

12. The apparatus of claim 11, wherein said third and fourth detectors comprise third and fourth coils disposed at positions facing said third and fourth positions and connected to said AC signal oscillator, and wherein portions of said gravity detection plate at said third and fourth positions are made of magnetic material.

13. The apparatus of claim 12, wherein said second comparator comprises a second bridge circuit for comparing inductance of said third coil with inductance of said fourth coil.

14. The apparatus of claim 10, wherein said second detector comprises:
- a gravity compensation plate made of a resilient material and received within said hollow portion, and which is parallel and coplanar with said pressure receiving plate, said gravity compensation plate being connected to the main body at a substantially center portion thereof so that respective lengths of said gravity compensation plate from said center portion to one end portion and from said center portion to the other end portion are different from each other;
- third and fourth detectors for detecting third and fourth deflections of said gravity compensation plate due to gravity at third and fourth positions spaced from each other at equal distance from said center portion;
- a second comparator for comparing said third deflection with said fourth deflection; and
- transmission means for transmitting an output of said second comparator to said AC signal oscillator to control an oscillated output voltage from said AC signal oscillator.

15. The apparatus of claim 14, wherein said third and fourth detectors comprise third and fourth coils disposed at positions facing said third and fourth positions and connected to said AC signal oscillator, and wherein portions of said gravity compensation plate at said third and fourth positions are made of magnetic material.

16. The apparatus of claim 15, wherein said second comparator comprises a second bridge circuit for comparing inductance of said third coil with inductance of said fourth coil.

* * * * *